United States Patent [19]

Perälä

[11] Patent Number: 4,851,646
[45] Date of Patent: Jul. 25, 1989

[54] ELECTRIC SAUNA STOVE

[75] Inventor: Reijo Perälä, Hangonkylä, Finland

[73] Assignee: Oy Helo-Tehtaat, Finland

[21] Appl. No.: 277,520

[22] Filed: Nov. 28, 1988

Related U.S. Application Data

[63] Continuation of Ser. No. 36,086, Apr. 9, 1987, abandoned.

[30] Foreign Application Priority Data

Apr. 10, 1986 [FI] Finland .................. 861524

[51] Int. Cl.[4] ............................................. H05B 1/02
[52] U.S. Cl. ................................. 219/483; 219/486;
219/494; 219/378; 219/361; 219/508; 41/524;
307/38
[58] Field of Search ................... 219/483–486,
219/494, 492, 507, 508, 479, 474, 379, 361, 364,
355, 476–478; 307/33, 38–41; 126/58, 524;
4/533; 237/19

[56] References Cited

U.S. PATENT DOCUMENTS

| | | | |
|---|---|---|---|
| 2,110,727 | 3/1938 | Heinisch et al. | 219/486 |
| 2,422,450 | 6/1947 | Van Daam | 219/474 |
| 2,495,419 | 1/1950 | Peterson | 219/474 |
| 3,532,857 | 10/1970 | Zeitlin | 219/479 |
| 3,892,946 | 7/1975 | Rimmi | 219/486 |
| 4,112,281 | 9/1978 | Epps | 219/474 |

FOREIGN PATENT DOCUMENTS

| | | |
|---|---|---|
| 44158 | 9/1971 | Finland . |
| 52655 | 10/1977 | Finland . |
| 46914 | 8/1984 | Finland . |
| 66532 | 12/1984 | Finland . |
| 853589 | 3/1987 | Finland . |
| 308419 | 5/1969 | Sweden . |

Primary Examiner—M. H. Paschall
Attorney, Agent, or Firm—Michael N. Meller

[57] ABSTRACT

A combined electric sauna stove and sauna room heater having a plurality of electrical resistors and electrical circuitry for controlling the current supply to the resistors. In order to eliminate the need of separate room heating elements in the sauna room, the electric sauna stove is provided with a heating resistor for maintaining a normal room temperature in the room where the stove is located while the room is not used for bathing. This heating resistor may be a room heating resistor separate from the electrical resistors of the stove or it may be formed by connecting in series two or three of the electrical resistors of the stove.

6 Claims, 2 Drawing Sheets

ELECTRIC SAUNA STOVE

This application is a continuation of application Ser. No. 360,86, filed 4/9/87 now abandoned.

FIELD OF THE INVENTION

This invention relates to an electric sauna stove with one or more electrical resistors and means for controlling the current supply to the resistors.

BACKGROUND ART

Saunas provided with an electric sauna stove and intended to be used all the year round are very often provided with an additional heating system in order to maintain a normal room temperature in the sauna room when it is not heated for bathing. The sauna room is conventionally heated by similar methods as the other parts of the building. A radiator with water circulation is a usual solution for the heating of a sauna room. In electrically heated buildings, the sauna room can be heated either by means of electric heaters specially designed for moist rooms or by means of floor heating which may be operated electrically or by means of warm circulation water. In any case, the heating of the sauna room to room temperature usually requires separate special arrangements which always bring about material and installation costs to some extent.

SUMMARY OF THE INVENTION

The object of the present invention is to provide a novel solution for the heating of a sauna room, by means of which the costs caused by the conventional devices required for the heating of the sauna room can be partly avoided and, in particular, the required installation work can be substantially eliminated. This is achieved by means of an electric sauna stove according to the invention by providing the sauna stove with a heating resistor for maintaining a normal room temperature in the room where the stove is positioned when the room is not used for bathing. This heating resistor may be a room heating resistor separate from the electric resistors of the stove or it may be formed by connecting in series two or three of the electric resistors of the stove.

The basic idea of the invention is that the sauna room can be heated by means of the electric sauna stove installed in the sauna room even when the sauna is not heated for bathing, because the stove is provided with a resistor suited for room heating, either as a separate resistor or by connecting in series some of the electric resistors of the stove. In this way the heating of the sauna room does not require any separate devices but the structures of the stove, and possibly also the equipment thereof, can be utilized. Especially in stoves having a built-in control unit, i.e. current is permanently connected to the stove, the electricity for the heating of the room can be obtained from the power supply of the stove. Additionally, the heating of the room can be controlled at least by means of the temperature limiter of the stove and possibly also by means of the thermostat thereof.

BRIEF DESCRIPTION OF THE DRAWINGS

In the following the electric sauna stove according to the invention and the advantages offered thereby will be described in more detail with reference to the attached drawings, wherein.

DESCRIPTION OF THE PREFERRED EMBODIMENTS

Figure 1:
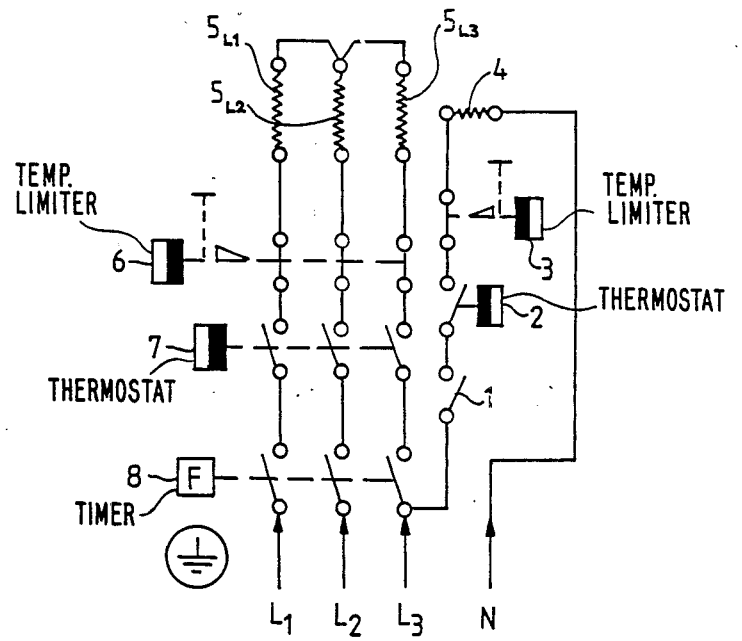
FIG. 1 shows the circuit diagram of the first embodiment of the electric sauna stove according to the invention.

FIG. 1 shows the circuit diagram of the first embodiment of the electric sauna stove according to the invention. In this specific embodiment, the electric sauna stove is a three-phase stove, comprising electric resistors $5_{L1}$, $5_{L2}$ and $5_{L3}$ which are star-connected. The resistors are supplied with a power from the lines $L_1$, $L_2$ and $L_3$ of a three-phase electrical network through a timer 8, a thermostat 7 and a temperature limiter 6. A separate room heating resistor 4 for heating the installation space of the stove in order to maintain a desired room temperature when the stove is not heated, is attached to the stove. This separate room heating resistor 4 can be positioned as desired in connection with the stove, e.g. outside, in front of or behind the stove, at the sides thereof, under or upon it, the most advantageous location being perhaps inside the stove so that the housing of the stove may partly form the housing of the room heating resistor. Naturally, the room heating resistor with its control means can be housed to form a separate unit which is fastened on the stove. In the embodiment shown in FIG. 1, the control means comprise a control switch 1, a thermostat 2 and a temperature limiter 3. The control switch 1 is connected to the line $L_3$ of the three-phase electrical network. One terminal of the heating resistor 4 is connected to a grounding conductor N of the three-phase network. In the electric sauna stove shown in FIG. 1, the control unit is arranged in connection with the stove. Current is thereby permanently connected to the input terminals of the timer 8 so that the room heating resistor 4 is always able to utilize this electrical connection. So it is not necessary to provide a separate electric wire for the room heating resistor, which considerably simplifies the installation, especially when taking into account the electric safety regulations concerning the installation spaces of sauna stoves.

Figure 2:
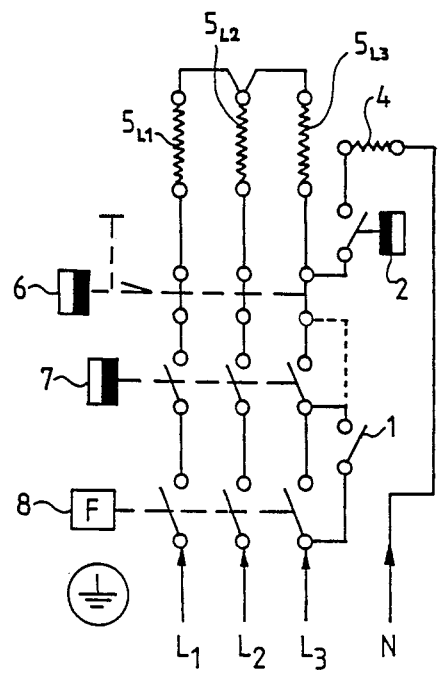
FIG. 2 shows the circuit diagram of the second embodiment of the electric sauna stove according to the invention.

The second embodiment of the invention shown in FIG. 2 is to a great extent similar to the first embodiment of the invention shown in FIG. 1. The same reference numerals are used in FIG. 2 for corresponding components which already appear in FIG. 1. The embodiment of FIG. 2 differs from that of FIG. 1 in that the temperature limiter 6 of the stove is also utilized by the room heating resistor 4 so that no separate temperature limiter, such as that denoted by the reference numeral 3 in FIG. 1, is needed. In the embodiment of FIG. 2, the switch 1 is connected in parallel with the timer 8, so that the stove thermostat 7 also affects the control of the room heating resistor 4. The broken line indicates an alternative switching in which the stove thermostat 7 is shunted and only the temperature limiter 6 is used. The thermostat 2 of the room heating resistor 4, having a fixed or adjustable setting, can be wholly omitted if the switch 1 is connected in parallel with the timer 8 and the stove thermostat 7 is in use. In electronically controlled sauna stoves, for instance, this can be effected by providing the thermostat with a selector switch and two thermistors one of which is used for controlling the room heating and the other when the sauna is heated for bathing. Alternatively, the resistance of the thermistor circuit included in the thermostat can be altered by means of an additional resistor connected in series or in parallel with the thermistor. The operating point of a thermistor can be shifted to the desired room temperature range also by heating the thermistor by means of a small separate resistor.

Figure 3:
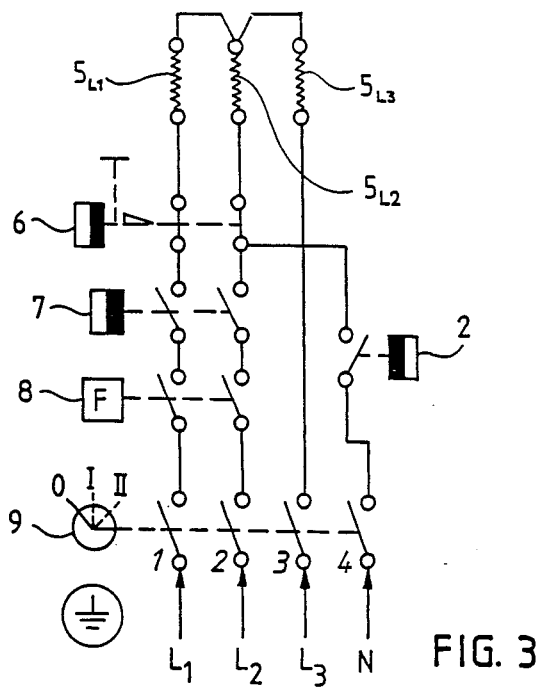
FIG. 3 shows the circuit diagram of the third embodiment of the electric sauna stove according to the invention.

In the third embodiment of the electric sauna stove according to the invention shown in FIG. 3, no separate room heating resistor is used. The same reference numerals as in FIGS. 1 and 2 are also used in FIG. 3 for those components which also appear in these figures. In the embodiment of FIG. 3, the possibility to heat the room is provided by connecting a three-position change-over switch 9 between the lines $L_1$, $L_2$, $L_3$ and N of the three-phase electrical network and the sauna stove. The lines $L_1$ and $L_2$ connected to the terminals 1 and 2 of the change-over switch are connected to the electrical resistors $5_{L1}$ and $5_{L2}$ of the stove through the timer 8, the thermostat 7 and the temperature limiter 6. The third electrical resistor $5_{L3}$, star-connected with the two other electrical resistors, is, in turn, directly connected to a contact 3 of the change-over switch 9. The ground conductor N of the electrical network is connected to the terminal 4 of the change-over switch and further through the room heating thermostat 2 to a terminal of the temperature limiter supplying the second electrical resistor $5_{L2}$ of the stove. In the embodiment of FIG. 3, the switch 9 has the following switching sequence:

|     | 1 | 2 | 3 | 4 |
| --- | --- | --- | --- | --- |
| 0   |   |   |   |   |
| I   | X | X | X |   |
| II  |   |   | X | X |

As appears from the above switching sequence, all the contacts are open when the switch is in the position 0, and when the switch is in the position I, the contacts 1, 2 and 3 are engaged so that current is supplied in the usual way to the electrical resistors of the stove. When the switch 9 is in the position II, only the contacts 3 and 4 are closed, so that the current flows from the line $L_3$ of the three-phase electrical network to the resistor $5_{L3}$ and further to the resistor $5_{L2}$ and through the thermostat 2 to the closed contact 4 of the switch 9 and further to the ground conductor N of the three-phase network. Two of the stove resistors are thereby connected in series so that the heating efficiency of both resistors is one fourth of the heating efficiency of one resistor. Accordingly, a heating efficiency of 1000 W can be obtained with a 6 kW stove, for instance.

Figure 4:
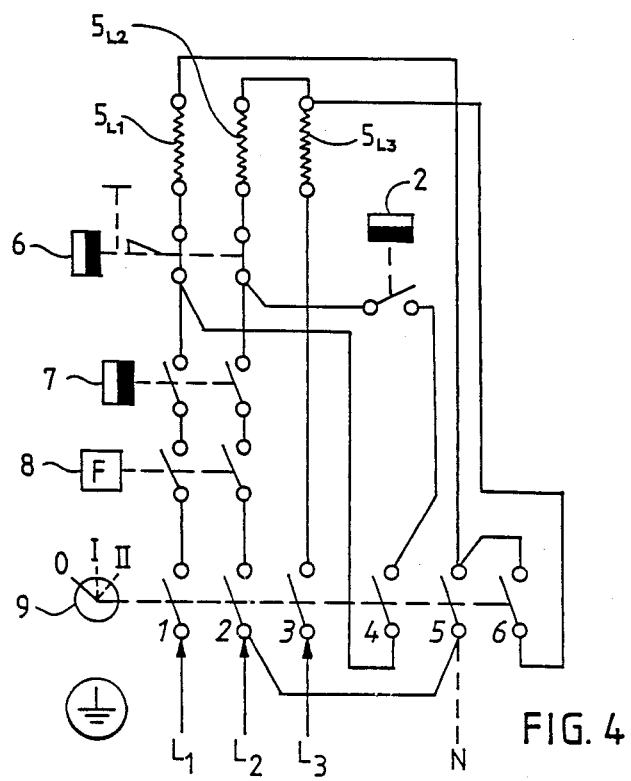
FIG. 4 shows the circuit diagram of the fourth embodiment of the electric sauna stove according to the invention.

FIG. 4 shows still another embodiment according to the invention, the same reference numerals as in FIGS. 1 to 3 being used for corresponding components. As compared with the embodiment of FIG. 3, the three-position change-over switch 9 of this embodiment has been modified so that it comprises six contacts having the following switching sequence:

|     | 1 | 2 | 3 | 4 | 5 | 6 |
| --- | --- | --- | --- | --- | --- | --- |
| 0   |   |   |   |   |   |   |
| I   | X | X | X |   |   | X |
| II  |   |   | X | X | X |   |

Consequently, all six contacts are open when the switch 9 is in the position 0. In the position I of the switch 9, the contacts 1, 2, 3 and 6 are closed, so that the stove is heated normally when its electrical resistors are supplied with a voltage from the lines $L_1$, $L_2$ and $L_3$ of the three-phase network through the contacts 1, 2 and 3 of the switch 9, and the contact 6 causes the resistors to be star-connected. In the position II of the switch 9, the contacts 3, 4 and 5 are closed. The three electrical resistors $5_{L1}$, $5_{L2}$, $5_{L3}$ of the stove are caused to be connected in series between the lines $L_2$ and $L_3$ of the three-phase network. The heating efficiency of each resistors is thereby one third of its usual electrical efficiency. With a conventional stove of 6 kW, this means a total heating efficiency of about 2 kW. As is indicated in FIG. 4 by the broken line, the series connection of the electrical resistors of the stove can also be connected between one line, $L_3$ for instance, and the ground conductor N of the three-phase network. The heating efficiency of each resistor is thereby one ninth of its usual efficiency. This latter connection is possible particularly in connection with stoves having a rather high efficiency.

The electric sauna stove according to the invention has been described above by means of specific embodiments, and it is to be understood that they can be modified in many ways. In particular, modifications can be made in the connections of the temperature limiters, the thermostats and the timers, which possibly can be used both for the heating of the sauna stove and for the heating of the room. In the connections according to FIGS. 3 and 4, for instance, the timer 8 and the switch 9 could be combined into a timer structure carrying out the functions of both components. Even though the invention has been described above with reference to an electric sauna stove provided with a built-in control unit so that the current supplied thereto can also be utilized for the room heating, it is, of course, possible to apply the invention in connection with stoves provided with a control unit separate from the stove. However, it is thereby necessary to bring a separate current conductor for the room heating.

What is claimed is:
1. An electric sauna stove comprising:
   sauna heating electrical resistor means for heating the stove to a first temperature range suitable for bathing;
   room heating electrical resistor means separate from said sauna heating electrical resistor means for heating the stove to a second temperature range suitable for heating a room in which the stove is located to a normal room temperature when the room is not used for bathing; and
   means for coupling a current supply means from an electric network to a selected one of said electrical resistor means comprising thermostatic means having said first and second temperature ranges for controlling the supply of current to said electrical resistor means in dependence on temperature, temperature limiter means and switch means for coupling the current supply means to said selected one of said electrical resistor means, said switch means comprising timed switch means for coupling the current to said sauna heating electrical resistor means only and control switch means for coupling the current to said room heating electrical resistor means only.

2. The stove as defined in claim 1, wherein said sauna heating electrical resistor means and said room heating electrical means are coupled in common to said current supply means by way of said temperature limiter means.

3. The stove as defined in claim 1, wherein said electrical resistors in said first predetermined arrangement and in said second predetermined arrangement are coupled in common to said current supply means by way of said temperature limiter means.

4. An electric sauna stove comprising:
a plurality of electrical resistors for heating the stove; and means for alternatively coupling selected ones of electrical resistors to a current supply means in a first or second predetermined arrangement, comprising thermostatic means having first and second temperature ranges for controlling a supply of current to said electrical resistors in dependence on temperature, temperature limiter means, and switch means for coupling the current supply means to selected ones of said electrical resistors in said first predetermined arrangement when said thermostatic means is set to said first temperature range and in said second predetermined arrangement when said thermostatic means is set to said second temperature range, further comprising timed switch means for coupling said first predetermined arrangement to the current supply means,
whereby the electrical resistors coupled in said first predetermined arrangement to said current supply means heat the stove to said first temperature range and the electrical resistors coupled in said second predetermined arrangement to said current supply means heat the stove to said second temperature range, said first temperature range being suitable for bathing and said second temperature range being suitable for heating a room in which the stove is located to a normal room temperature when the room is not used for bathing.

5. The stove as defined in claim 4, wherein in said first predetermined arrangement, first terminals of first, second and third electrical resistors are connected in series and second terminals of said first, second and third electrical resistors are respectively connected to first, second and third lines of said current supply means, and in said second predetermined arrangement, said second and third electrical resistors are connected in series between said third line of said current supply means and ground.

6. The stove as defined in claim 4, wherein in said first predetermined arrangement, first terminals of first, second and third electrical resistors are connected in series and second terminals of said first, second and third electrical resistors are respectively connected to first, second and third lines of said current supply means, and in said second predetermined arrangement, said first, second and third electrical resistors are connected in series between said third line of said current supply means and ground.

* * * * *